(12) United States Patent
Luo et al.

(10) Patent No.: US 9,328,234 B2
(45) Date of Patent: May 3, 2016

(54) POLY((METH)ACRYLIC ACID-B-STYRENE-B-BUTADIENE-B-STYRENE) BLOCK COPOLYMER LATEX AND METHOD FOR PREPARING THE SAME

(71) Applicant: ZHEJIANG UNIVERSITY, Hangzhou (CN)

(72) Inventors: Yingwu Luo, Hangzhou (CN); Renzhong Wei, Hangzhou (CN); Xiang Gao, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 296 days.

(21) Appl. No.: 14/203,379

(22) Filed: Mar. 10, 2014

(65) Prior Publication Data

US 2014/0303280 A1    Oct. 9, 2014

Related U.S. Application Data

(63) Continuation of application No. PCT/CN2012/072658, filed on Mar. 21, 2012.

(30) Foreign Application Priority Data

Mar. 15, 2012  (CN) .......................... 2012 1 0067021

(51) Int. Cl.
| | |
|---|---|
| *C08L 83/00* | (2006.01) |
| *C08L 47/00* | (2006.01) |
| *C08F 2/38* | (2006.01) |
| *C09D 153/00* | (2006.01) |
| *C09J 153/00* | (2006.01) |
| *C08F 2/22* | (2006.01) |
| *C08F 293/00* | (2006.01) |

(52) U.S. Cl.
CPC . *C08L 47/00* (2013.01); *C08F 2/22* (2013.01); *C08F 2/38* (2013.01); *C08F 293/005* (2013.01); *C09D 153/00* (2013.01); *C09J 153/00* (2013.01); *C08F 2438/03* (2013.01)

(58) Field of Classification Search
CPC .............................. C08F 293/00; C08L 47/00
See application file for complete search history.

(56) References Cited

U.S. PATENT DOCUMENTS

2015/0126667 A1*  5/2015  Xu ........................... C08F 2/24
524/460

FOREIGN PATENT DOCUMENTS

| CN | 101591403 A | 12/2009 |
|---|---|---|
| CN | 101955555 A | 1/2011 |
| CN | 102225990 A | 10/2011 |
| CN | 102585123 B | 9/2013 |
| FR | 2 962 441 A1 | 1/2012 |

OTHER PUBLICATIONS

English Translation of CN 101955555 (2011).*
"VA-061;" "VA-044;" "V50" Wako Specialty Chemicals. <http://www.wako-chem.co.jp> 1997 (retrieved on Feb. 21, 2016).*
"V501." Wiley Online Library <http://onlinelibrary.wiley.com> 1999 (retrieved on Feb. 21, 2016).*
International Search Report of corresponding International Application No. PCT/CN2012/072658, dated Dec. 27, 2012.
Renzhong Wei et al., "Ab Initio RAFT Emulsion Polymerization of Butadiene Using the Amphiphilic Poly(acrylic acid-b-styrene) Trithiocarbonate as Both Surfactant and Mediator" Journal of Polymer Science Part A: Polymer Chemistry, vol. 49, Issue 13, pp. 2980-2989, Jul. 1, 2011.

* cited by examiner

*Primary Examiner* — Hannah Pak
(74) *Attorney, Agent, or Firm* — J.C. Patents

(57) ABSTRACT

The present invention discloses a poly((meth)acrylic acid-b-styrene-b-butadiene-b-styrene) block copolymer latex and a method for preparing the same. The poly((meth)acrylic acid-b-styrene-b-butadiene-b-styrene) block copolymer latex is directly and stably obtained by emulsion polymerization in the presence of an amphiphilic macromolecule reversible addition fragmentation chain transfer agent as both chain transfer agent and reactive emulsifier. The present invention has simple operation, and the process is environmentally friendly and energy-saving, the product poly ((meth) acrylic acid-b-styrene-b-butadiene-b-styrene) block copolymer latex has a good prospect in many fields, such as bitumen modification, adhesives, polymer toughening and the like.

6 Claims, 3 Drawing Sheets

POLY((METH)ACRYLIC ACID-B-STYRENE-B-BUTADIENE-B-STYRENE) BLOCK COPOLYMER LATEX AND METHOD FOR PREPARING THE SAME

CROSS-REFERENCE TO RELATED APPLICATIONS

This application is a continuation of International Application No. PCT/CN2012/072658, filed on Mar. 21, 2012, which claims the priority benefit of China Patent Application No. 201210067021.6, filed on Mar. 15, 2012. The contents of the above identified applications are incorporated herein by reference in their entireties.

FIELD OF THE TECHNOLOGY

The present invention relates to polymer technical field, and particularly to a poly((meth)acrylic acid-b-styrene-b-butadiene-b-styrene) block copolymer latex and a method for preparing the same.

BACKGROUND

As an important styrene-based thermoplastic elastomer (TPS), poly(styrene-b-butadiene-b-styrene) (SBS) is extremely important in industrial applications, including bitumen modification, adhesives, shoe manufacturing, polymer toughening and other aspects. SBS can be plasticized and molded at a high temperature and shows characteristics of rubber elastomer at room temperature. Polystyrene block and polybutadiene block are thermodynamically incompatible, and thus there is a micro-phase separation therebetween, polystyrene block microdomains dispersed in polybutadiene block continuous phase can act as physical cross-linking points at room temperature, the microdomains will disappear when heated to above the melting temperature of polystyrene. Therefore, SBS material can be processed, for example by injecting, blow molding, extruding, compression molding and the like.

In the existing inventions of industrial technologies, poly(styrene-b-butadiene-b-styrene) block copolymers are prepared using anionic solution polymerization process. In the anionic solution polymerization method, since chain termination and chain transfer reactions do not happen, polymers with predetermined molecular weight and narrow distribution can be prepared; and meanwhile, microstructure of the block copolymer, such as composition, molecular weight and its distribution of blocks, sequence of blocks, can be controlled by regulating the polymerization temperature, the initiator system, the order of addition of monomers, solvent or coupling agent and the like. However, due to using organic metal as a catalyst, the polymerization condition is very severe and most of solvent needs to be recycled. Compared with radical polymerization, the anionic solution polymerization has huge disadvantages in terms of energy consumption and environmental protection, as well as polymerization conditions. Further, under mild conditions, the anionic solution polymerization process cannot introduce monomers with polar groups, which limits the application of SBS in many fields.

In 1998, Graeme Moad, Ezio Rizzardo et al. found the reversible addition fragmentation chain transfer (RAFT) radical polymerization, after that, people have been exploring the technology of preparing block polymers through radical polymerization. The chain transfer agents used in this technology is referred to as reversible addition fragmentation chain transfer agent. As the reversible addition fragmentation chain transfer is suitable for a wide range of monomers, has radical isolation effect in a heterogeneous system and has rapid reaction speed, it is currently considered as one of the most promising radical polymerization technologies for industrialization. The Reversible addition fragmentation chain transfer technology can very effectively control the polymerization of monomers, and the molecular weights in a large range can be controlled to achieve a target molecular weight and a narrow molecular weight distribution. Radical polymerization can be carried out by emulsion polymerization. The emulsion polymerization is characterized by low viscosity and having no organic solvent, etc., and thus can be directly used to prepare polymer latex. The latex can be directly applied to paints, adhesives and other fields, and thereby brings great convenience for industrial production. In living radical polymerization, most of polymer chains can remain active during polymerization, and thus multi-block copolymer can be prepared by adding different monomers in different steps.

The common problems existed in RAFT emulsion polymerization are emulsion instability, molecular weight runaway, broad molecular weight distribution and the like. Gilbert et al. solved the problem of emulsion instability by using an amphiphilic macromolecule polymethacrylic acid-polybutyl acrylate as the reversible addition fragmentation chain transfer agent to conduct RAFT semi-continuous emulsion polymerization of styrene fed with starvation method, but this process is complex, and the obtained molecular weight has a great deviation from the predetermined molecular weight, that is, the target block copolymer was not obtained. In 2008, Charleux et al. conducted a batch emulsion polymerization of styrene by using polyethylene oxide-containing macromolecule as the reversible addition fragmentation chain transfer agent, with final conversion of only 66.7% after 22.7 hours. Other amphiphilic macromolecule reversible addition fragmentation chain transfer agents, such as polystyrene-polyvinylphenyltriethyl ammonium chloride as a two-block reversible addition fragmentation chain transfer agent, polydiethylaminoethyl methacrylate as a mono-block reversible addition fragmentation chain transfer agent, polyethylene oxide-polydiethylaminoethyl methacrylate as a two-block reversible addition fragmentation chain transfer agent, do not exhibit controllability of molecular weight and molecular weight distribution in batch emulsion polymerization of styrene. At present, the reason for the failure of RAFT emulsion polymerization of styrene is that polyacrylic acid-based amphiphilic macromolecule reversible addition fragmentation chain transfer agents have inappropriate length ratios of the hydrophilic segment to the lipophilic segment and thus these agents will be dissolved into water to form an aqueous phase only after additionally adding an alkali thereinto, and the formed aqueous phase has a pH≥5.5, leading to such results of polymerization reaction that the molecular weight of the product is runaway, molecular weight distribution is broad, the polymerization inhibition period is very long, the reaction speed is slow, the final conversion is low, the emulsion is unstable, and high molecular weight polymers and block copolymers cannot be well synthesized. Yingwu Luo et al. found that the amphiphilic RAFT agents can be dissolved into water without neutralization, by extending the length of ionizable polyacrylic acid segments of amphiphilic RAFT agents, and a supplementary addition of alkaline solution during emulsion polymerization will lead to ionization of the carboxyl of the hydrophilic segments of the amphiphilic macromolecule reversible addition fragmentation chain transfer agents, to increase the electrical charges and improve the stability of the emulsion, and thereby an amphiphilic block polymer with high molecular weight has been successfully prepared, where the hydrophilic monomer may be acrylic acid or methacrylic acid, and the lipophilic monomer may be styrene or acrylic esters. This process has short reaction time and high final conversion, and also the actual molecular weight is consistent with the predetermined molecular weight, the molecular weight distribution is <2.5, etc. Poly(styrene-b-butyl acrylate-b-styrene) as a three-block copolymer can be prepared according to this process.

SUMMARY

An object of the present invention is to provide a poly((meth)acrylic acid-b-styrene-b-butadiene-b-styrene) block copolymer latex and a method for preparing the same, so as to overcome the deficiencies of the above prior arts.

The above object of the present invention is achieved by the following technical solutions: a method for preparing a poly((meth)acrylic acid-b-styrene-b-butadiene-b-styrene) block copolymer latex, including: adding 0.2 to 2 parts by weight of an amphiphilic macromolecule reversible addition fragmentation chain transfer agent to 20 to 100 parts by weight of water to form an aqueous phase; mixing the aqueous phase and 2 to 10 parts by weight of styrene, and transferring the resulting mixture into a reactor; purging with nitrogen gas under stirring to remove oxygen from the reactor for 30 to 60 minutes; after heating up to 60° C. to 80° C., adding 0.005 to 0.04 parts by weight of a water-soluble initiator, to initiate the polymerization for 20 to 110 minutes; adding 0.02 to 1 part by weight of an alkali and 0.1 to 0.5 parts by weight of sodium dodecyl sulfate (SDS), after completely mixing, adding 2 to 100 parts by weight of butadiene and additional 0 to 0.1 parts by weight of the water-soluble initiator, to react for 0.5 to 10 hours; slowly releasing the pressure and discharging the unreacted butadiene from the reactor; adding 2 to 10 parts by weight of styrene to the reactor, to continuously react for 20 to 110 minutes; and cooling the discharge and adding a terminating agent thereto.

The chemical structure of the amphiphilic macromolecule reversible addition fragmentation chain transfer agent is represented by the following general formula:

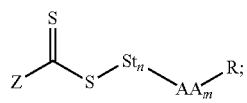

in which, AA represents methacrylic acid monomer unit or acrylic acid monomer unit; St represents styrene monomer unit; Z represents alkylthio having 4 to 12 carbon atoms, alkyl having 4 to 12 carbon atoms, phenyl or benzyl; R represents iso-propionyloxy, acetoxy, 2-cyanoacetoxy or 2-amidoacetoxy; m represents an average degree of polymerization of the methacrylic acid monomer unit or the acrylic acid monomer unit and m=10-60; n represents an average degree of polymerization of the styrene monomer unit and n=3-10. The amphiphilic macromolecule reversible addition fragmentation chain transfer agent may be amphiphilic oligomer with a molecular weight of 1000-6000. The water-soluble initiator may be potassium persulfate, ammonium persulfate, hydrogen peroxide, and derivatives thereof, and VA-061, VA-044, V501 or V50. The alkali may be sodium hydroxide, potassium hydroxide, ammonia, sodium carbonate, potassium carbonate, sodium bicarbonate or potassium bicarbonate.

The resulting poly((meth)acrylic acid-b-styrene-b-butadiene-b-styrene) block copolymer latex is characterized in that: the poly((meth)acrylic acid-b-styrene-b-butadiene-b-styrene) block copolymer is dispersed in water in the form of particles, to be called as a latex, having an volume average particle diameter of 60-200 nm and a core-shell structure. Structure of the poly((meth)acrylic acid-b-styrene-b-butadiene-b-styrene) block copolymer can be expressed as $AA_{n1}$-$St_{n2}$-$Bd_{n3}$-$St_{n4}$-R, where AA represents methacrylic acid monomer unit or acrylic acid monomer unit, St represents styrene monomer unit, Bd represents butadiene monomer unit, R represents an alkyldithio ester group or an alkyltrithio ester group, average degree of polymerization of each block is $n_1$=20-60, $n_2$=100-500, $n_3$=200-3000, $n_4$=100-500; if $n_3$>1500, a portion of polybutadiene segments forms a crosslinked structure, resulting in a gel, content of which increases with the increase of $n_3$.

The present invention achieves the following technical effects:

1. the emulsion polymerization is characterized by having a low viscosity, fast heat transfer, less pollution, etc.;

2. the polymer obtained comprises polyacrylic acid segment or polymethacrylic acid segment which give the block copolymer polarity, and the polymer has a wider application than the conventional SBS in many fields, the products thereof may be used as a binder of a polar material, a modifier of a polar polymer material, and also a phase compatilizer of a polymer composite or a polymer blend;

3. the latex product can be directly applied to fields of aqueous coatings with high performance and adhesives; and 4. the requirement for raw materials and equipments is low since the method of the present invention utilizes a living radical emulsion polymerization to prepare a poly((meth)acrylic acid-b-styrene-b-butadiene-b-styrene) block copolymer latex in the presence of a reversible addition fragmentation chain transfer agent.

DETAILED DESCRIPTION

Figure 1:
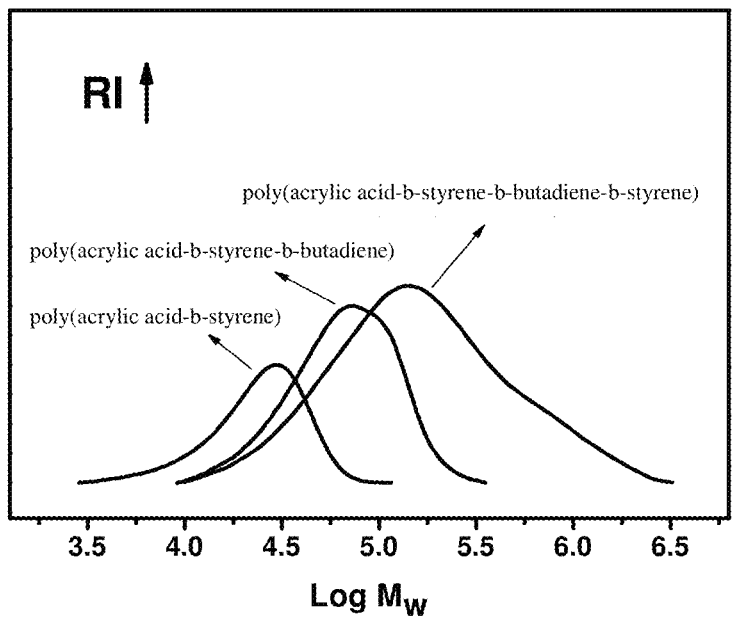
FIG. 1 is a GPC spectrum showing the increase of the molecular weight of poly(acrylic acid-b-styrene-b-butadiene-b-styrene) during its preparation according to Embodiment 1.
Figure 2:
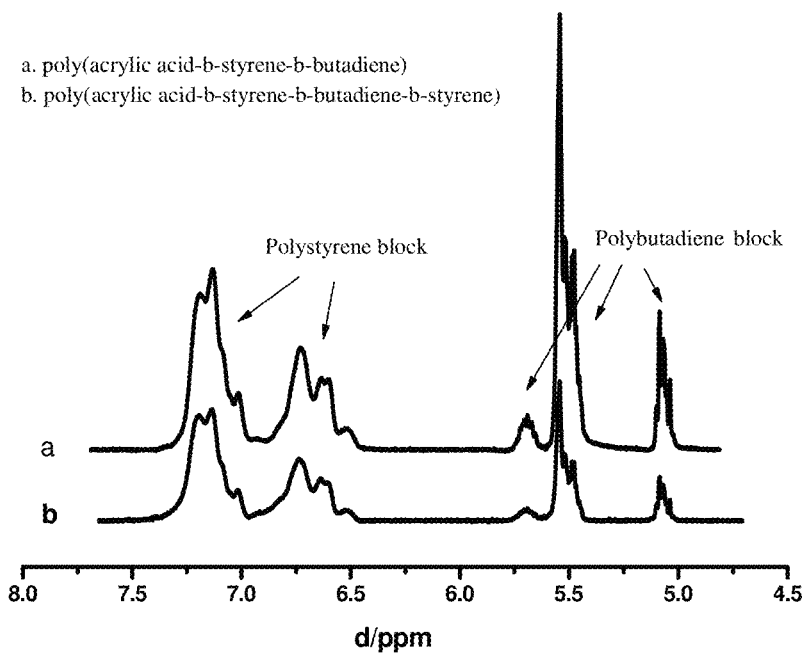
FIG. 2 is a $^1$H NMR spectrum of poly(acrylic acid-b-styrene-b-butadiene) and poly(acrylic acid-b-styrene-b-butadiene-b-styrene) according to Embodiment 1.
Figure 3:
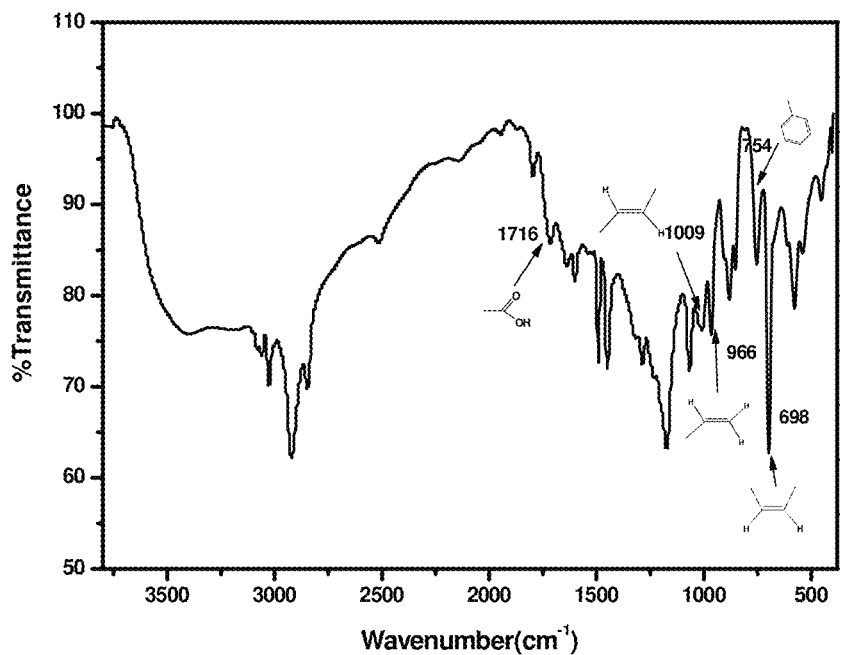
FIG. 3 is an IR spectrum of poly(acrylic acid-b-styrene-b-butadiene-b-styrene) according to Embodiment 1.
Figure 4:
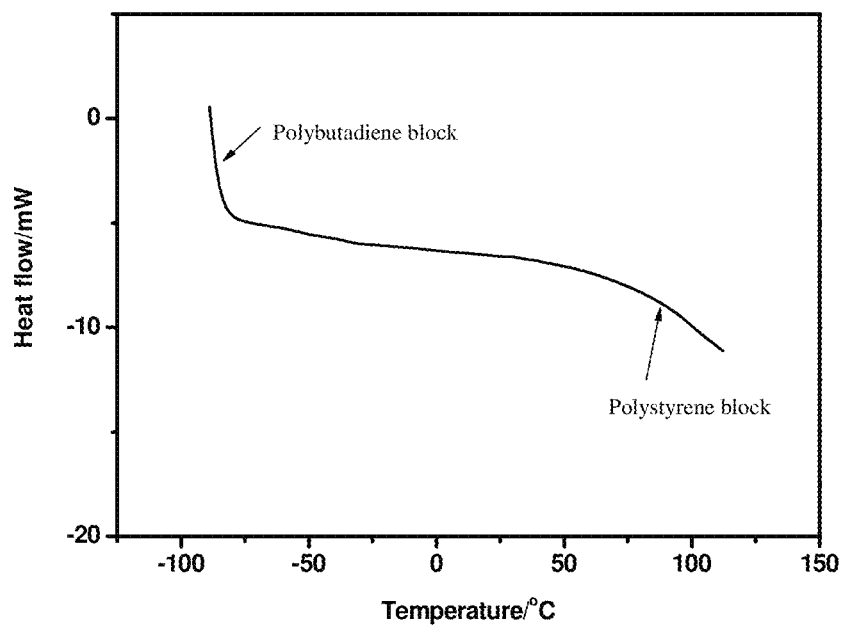
FIG. 4 is a DSC spectrum of poly(acrylic acid-b-styrene-b-butadiene-b-styrene) according to Embodiment 1.
Figure 5:
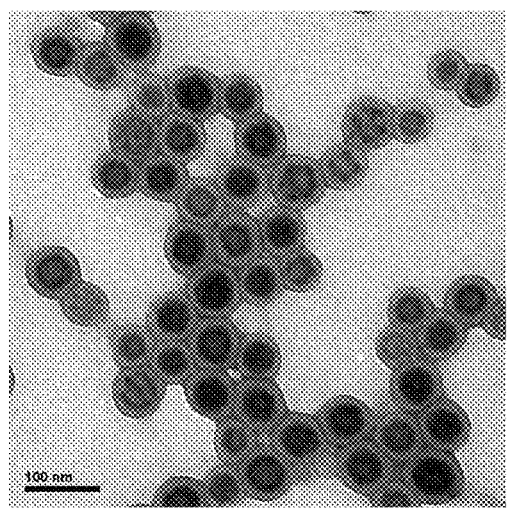
FIG. 5 is a TEM photograph of poly(acrylic acid-b-styrene-b-butadiene-b-styrene) latex according to Embodiment 1.

The present invention is achieved by the following technical means: 0.2 to 2 parts by weight of an amphiphilic macromolecule reversible addition fragmentation chain transfer agent are added into 20 to 100 parts by weight of water, to form an aqueous phase. The aqueous phase is mixed with 2 to 10 parts by weight of styrene. The resulting mixture is transferred into a reactor, and nitrogen is fed into the reactor under stirring to discharge oxygen for 30 to 60 minutes. After heating up to 60° C. to 80° C., 0.005 to 0.04 parts by weight of a water-soluble initiator is added to initiate polymerization for 20 to 110 minutes. 0.02 to 1 part by weight of alkali and 0.1 to 0.5 parts by weight of sodium dodecyl sulfate (SDS) are added, after completely mixing, 2 to 100 parts by weight of butadiene and 0 to 0.1 parts by weight of additional water-soluble initiator are added. The reaction is conducted for 0.5 to 10 hours. Then the pressure is slowly released from the reactor and the unreacted butadiene is discharged from the reactor, and 2 to 10 parts by weight of styrene are added into the reactor to continuously react for 20 to 110 minutes. Then the discharge is cooled and a terminating agent is added. Conversion of the monomers is obtained by gravimetric method.

The amphiphilic macromolecule reversible addition fragmentation chain transfer agent has a chemical structure represented by the following general formula:

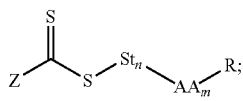

where, AA represents methacrylic acid monomer unit or acrylic acid monomer unit; St represents styrene monomer unit; Z represents alkylthio having 4 to 12 carbon atoms, alkyl having 4 to 12 carbon atoms, phenyl or benzyl; R represents iso-propionyloxy, acetoxy, 2-cyanoacetoxy or 2-amidoacetoxy; m represents an average degree of polymerization of the methacrylic acid monomer unit or the acrylic acid monomer unit and m=10-60; n represents an average degree of polymerization of the styrene monomer unit and n=3-10. The amphiphilic macromolecule reversible addition fragmentation chain transfer agent may be an amphiphilic oligomer with a molecular weight of 1000-6000.

Dilute sulfuric acid solution and sodium chloride solution are used to break the emulsion of poly((meth)acrylic acid-b-styrene-b-butadiene-b-styrene) block copolymer latex, the resulting copolymer product is to be dried in vacuo. The dried poly((meth)acrylic acid-b-styrene-b-butadiene-b-styrene) block copolymer is extracted by using tetrahydrofuran as solvent at 75° C., and content of gel thereof may be calculated by gravimetric method.

Theoretical degrees of polymerization of each block of poly((meth)acrylic acid-b-styrene-b-butadiene-b-styrene) block copolymer, $n_2$, $n_3$ and $n_4$, may be obtained by the following formula:

$$n_i = \frac{C_i \times [M_i]_0}{[RAFT]_0}$$

in which, $C_i$ is the conversion of the monomer i, $[M_i]_0$ is the initial molar concentration of the monomer i, $[RAFT]_0$ is the initial molar concentration of the amphiphilic macromolecule reversible addition fragmentation chain transfer agent.

Each of the organic functional groups in the poly((meth)acrylic acid-b-styrene-b-butadiene-b-styrene) block copolymer may be got based on $^1$H nuclear magnetic resonance spectrometry ($^1$H NMR) and infrared spectrometry (IR).

The structures of the blocks of the poly((meth)acrylic acid-b-styrene-b-butadiene-b-styrene) block copolymer may be confirmed by GPC spectrum and variable molecular weight.

Morphology and size of the poly((meth)acrylic acid-b-styrene-b-butadiene-b-styrene) block copolymer latex may be obtained by transmission electron microscopy (TEM).

Embodiment 1

80 parts by weight of water, 2 parts by weight of macroRAFT1 (its chemical structure is as shown below, obtained by analyzing its $^1$H nuclear magnetic resonance spectroscopy) as amphiphilic macromolecule reversible addition fragmentation chain transfer agent, and 10 parts by weight of styrene were added into a reactor. The resulting mixture was mixed under stirring, and nitrogen was fed into the reactor for 30 minutes. After heating up to 70° C., 0.04 parts by weight of potassium persulfate was added to initiate the reaction. After reacting for 45 min, 0.5 parts by weight of sodium hydroxide and 0.5 parts by weight of sodium dodecyl sulfate (SDS) were added to the reactor. After completely mixing, 30 parts by weight of butadiene and additional 0.005 parts by weight of potassium persulfate were added. The reaction was continued for another 50 minutes. Then the pressure was slowly released and the unreacted butadiene was discharged from the reactor, and 10 parts by weight of styrene was added to the reactor, to continuously react for 30 minutes. Subsequently, the discharge was cooled and a solution of the terminating agent hydroquinone (1%) in THF was added, to obtain a block copolymer as latex. FIG. 1 shows the variation of the molecular weight, as measured by GPC spectrum, of the resulting block polymer: macroRAFT1 reacted with styrene to obtain poly(acrylic acid-b-styrene), a two-block polymer, which subsequently reacted with butadiene to obtain poly(acrylic acid-b-styrene-b-butadiene) having the correspondingly increased molecular weight, a three-block polymer, which continuously reacted with styrene to obtain poly(acrylic acid-b-styrene-b-butadiene-b-styrene) having continuously increased molecular weight, a four-block polymer. The result shows that the molecular chain always remains active during the polymerization, so that a multi-block polymer was successfully obtained. It has been confirmed that the resulting product has predetermined structure using $^1$H NMR, IR, DSC and TEM (as is shown in FIGS. 2, 3, 4 and 5, respectively). The latex particle shown in FIG. 5 was stained with osmium tetraoxide vapour, and has a core-shell structure, where the core is formed of micro-phase of the polybutadiene block and the shell is formed of micro-phase of the polystyrene block. The predetermined molecular weight and the measured molecular weight of each block of the resulting block copolymer were shown in table 1 below, where the fraction of the gel is 0%.

MacroRAFT1 has a chemical structure represented by the following formula:

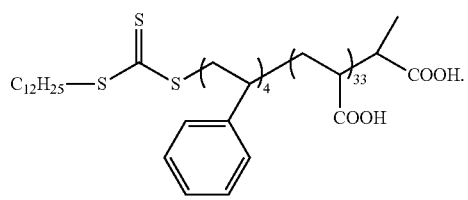

Embodiment 2

100 parts by weight of water, 1 part by weight of macroRAFT2 (its chemical structure is as shown below, obtained by analyzing its $^1$H nuclear magnetic resonance spectroscopy) as amphiphilic macromolecule reversible addition fragmentation chain transfer agent, and 10 parts by weight of styrene were added into a reactor. The resulting mixture was mixed under stiffing, and nitrogen was fed into the reactor for 60 minutes. After heating up to 70° C., 0.04 parts by weight of potassium persulfate was added to initiate the reaction. After reacting for 45 min, 0.5 parts by weight of sodium hydroxide and 0.4 parts by weight of sodium dodecyl sulfate (SDS) were added to the reactor. After completely mixing, 20 parts by weight of butadiene and additional 0.02 parts by weight of potassium persulfate were added. The reaction was continued for another 4 hours. Then the pressure was slowly released and the unreacted butadiene was discharged from the reactor, and 10 parts by weight of styrene was added to the reactor, to continuously react for 30 minutes. Subsequently, the discharge was cooled and a solution of the terminating agent hydroquinone (1%) in THF was added, to obtain a block copolymer as latex. The predetermined molecular weight and the measured molecular weight of each block of the resulting block copolymer were shown in table 1 below, where the fraction of the gel is 0%.

MacroRAFT2 has a chemical structure represented by the following formula:

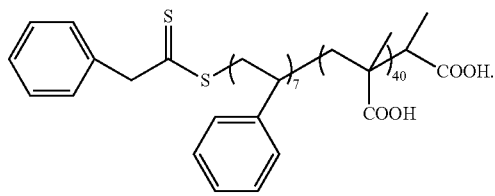

Embodiment 3

40 parts by weight of water, 0.2 part by weight of macroRAFT1 (its chemical structure is as given in Embodiment 1) as amphiphilic macromolecule reversible addition fragmentation chain transfer agent, and 4 parts by weight of styrene were added into a reactor. The resulting mixture was mixed under stirring, and nitrogen was fed into the reactor for 30 minutes. After heating up to 70° C., 0.04 parts by weight of potassium persulfate was added to initiate the reaction. After reacting for 45 min, 0.5 parts by weight of sodium hydroxide and 0.1 parts by weight of sodium dodecyl sulfate (SDS) were added to the reactor. After completely mixing, 18 parts by weight of butadiene and additional 0.1 parts by weight of potassium persulfate were added. The reaction was continued for another 6 hours. Then the pressure was slowly released and the unreacted butadiene was discharged from the reactor, and then 4 parts by weight of styrene was added to the reactor, to continuously react for 30 minutes. Subsequently, the discharge was cooled and a solution of the terminating agent hydroquinone (1%) in THF was added, to obtain a block copolymer as latex. The predetermined molecular weight and the measured molecular weight of each block of the resulting block copolymer were shown in table 1 below, where the fraction of the gel is 20%.

Embodiment 4

50 parts by weight of water, 0.5 part by weight of macroRAFT1 (its chemical structure is as given in Embodiment 1) as amphiphilic macromolecule reversible addition fragmentation chain transfer agent, and 2 parts by weight of styrene were added into a reactor. The resulting mixture was mixed under stirring, and nitrogen was fed into the reactor for 60 minutes. After heating up to 70° C., 0.005 parts by weight of potassium persulfate was added to initiate the reaction. After reacting for 60 min, 0.05 parts by weight of sodium hydroxide and 0.3 parts by weight of sodium dodecyl sulfate (SDS) were added to the reactor. After completely mixing, 50 parts by weight of butadiene and additional 0.04 parts by weight of potassium persulfate were added. The reaction was continued for another 10 hours. Then the pressure was slowly released and the unreacted butadiene was discharged from the reactor, and then 2 parts by weight of styrene was added to the reactor, to continuously react for 45 minutes. Subsequently, the discharge was cooled and a solution of the terminating agent hydroquinone (1%) in THF was added, to obtain a block copolymer as latex. The predetermined molecular weight and the measured molecular weight of each block of the resulting block copolymer were shown in table 1 below, where the fraction of the gel is 80%.

Embodiment 5

40 parts by weight of water, 0.5 part by weight of macroRAFT1 (its chemical structure is as given in Embodiment 1) as amphiphilic macromolecule reversible addition fragmentation chain transfer agent, and 4 parts by weight of styrene were added into a reactor. The resulting mixture was mixed under stirring, and nitrogen was fed into the reactor for 30 minutes. After heating up to 70° C., 0.01 parts by weight of potassium persulfate was added to initiate the reaction. After reacting for 50 min, 0.05 parts by weight of sodium hydroxide and 0.3 parts by weight of sodium dodecyl sulfate (SDS) were added to the reactor. After completely mixing, 10 parts by weight of butadiene was added. The reaction was continued for another 3 hours. Then the pressure was slowly released and the unreacted butadiene was discharged from the reactor, and then 4 parts by weight of styrene was added to the reactor, to continuously react for 40 minutes. Subsequently, the discharge was cooled and a solution of the terminating agent hydroquinone (1%) in THF was added, to obtain a block copolymer as latex. The predetermined molecular weight and the measured molecular weight of each block of the resulting block copolymer were shown in table 1 below, where the fraction of the gel is 0%.

Embodiment 6

80 parts by weight of water, 1 part by weight of macroRAFT2 (its chemical structure is as given in Embodiment 2) as amphiphilic macromolecule reversible addition fragmentation chain transfer agent, and 10 parts by weight of styrene were added into a reactor. The resulting mixture was mixed under stirring, and nitrogen was fed into the reactor for 30 minutes. After heating up to 60° C., 0.01 parts by weight of potassium persulfate was added to initiate the reaction. After reacting for 110 min, 0.05 parts by weight of sodium hydroxide and 0.4 parts by weight of sodium dodecyl sulfate (SDS) were added to the reactor. After completely mixing, 15 parts by weight of butadiene and additional 0.02 parts by weight of potassium persulfate were added. The reaction was continued for another 3 hours. Then the pressure was slowly released and the unreacted butadiene was discharged from the reactor, and then 10 parts by weight of styrene was added to the reactor, to continuously react for 60 minutes. Subsequently, the discharge was cooled and a solution of the terminating agent hydroquinone (1%) in THF was added, to obtain a block copolymer as latex. The predetermined molecular weight and the measured molecular weight of each block of the resulting block copolymer were shown in table 1 below, where the fraction of the gel is 0%.

Embodiment 7

20 parts by weight of water, 0.2 part by weight of macroRAFT1 (its chemical structure is as given in Embodiment 1) as amphiphilic macromolecule reversible addition fragmentation chain transfer agent, and 1 part by weight of styrene were added into a reactor. The resulting mixture was mixed under stirring, and nitrogen was fed into the reactor for 30 minutes. After heating up to 80° C., 0.01 parts by weight of potassium persulfate was added to initiate the reaction. After reacting for 20 min, 0.005 parts by weight of sodium hydroxide and 0.1 parts by weight of sodium dodecyl sulfate (SDS) were added to the reactor. After completely mixing, 2 parts by weight of butadiene and additional 0.005 parts by weight of potassium persulfate were added. The reaction was continued for another 0.5 hours. Then the pressure was slowly released and the unreacted butadiene was discharged from the reactor, and then 1 part by weight of styrene was added to the reactor, to continuously react for 20 minutes. Subsequently, the discharge was cooled and a solution of the terminating agent hydroquinone (1%) in THF was added, to obtain a block copolymer as latex. The predetermined molecular weight and the measured molecular weight of each block of the resulting block copolymer were shown in table 1 below, where the fraction of the gel is 0%.

TABLE 1

The predetermined molecular weight and GPC-measured molecular weight of the resulting block copolymer and molecular weight distribution thereof (blocks of the block copolymer correspond to $AA_{n1}\text{-}St_{n2}\text{-}Bd_{n3}\text{-}St_{n4}$, Mn and PDI represent number average molecular weight and molecular weight distribution coefficient of the block copolymer, as measured by GPC; for Embodiments 3 and 4, molecular weight of the block copolymer cannot be measured for the production of gel).

| Embodiment | Predetermined molecular weight | $AA_{n1}\text{-}St_{n2}$ copolymer | | $AA_{n1}\text{-}St_{n2}\text{-}Bd_{n3}$ copolymer | | $AA_{n1}\text{-}St_{n2}\text{-}Bd_{n3}\text{-}St_{n4}$ copolymer | | GPC-measured molecular weight |
|---|---|---|---|---|---|---|---|---|
| | | Mn | PDI | Mn | PDI | Mn | PDI | |
| 1 | 3K-16K-22K-16K | 19K | 1.19 | 44K | 1.29 | 61K | 1.32 | 3K-16K-25K-17K |
| 2 | 4K-31K-65K-31K | 36K | 1.26 | 106K | 1.32 | 134K | 1.52 | 4K-32K-70K-28K |
| 3 | 3K-52K-108K-52K | 53K | 1.26 | — | — | — | — | — |
| 4 | 3K-10K-162K-10K | 13K | 1.15 | — | — | — | — | — |
| 5 | 3K-20K-54K-20K | 23K | 1.18 | 82K | 1.39 | 100K | 1.46 | 3K-20K-59K-18K |
| 6 | 4K-31K-43K-31K | 34K | 1.22 | 83K | 1.38 | 110K | 1.56 | 4K-30K-49K-27K |
| 7 | 3K-16K-32K-16K | 19K | 1.20 | 49K | 1.25 | 64K | 1.30 | 3K-16K-30K-15K |

What is claimed is:

1. A poly((meth)acrylic acid-b-styrene-b-butadiene-b-styrene) block copolymer, wherein
   (1) structure of the poly((meth)acrylic acid-b-styrene-b-butadiene-b-styrene) block copolymer can be expressed as $AA_{n1}\text{-}St_{n2}\text{-}Bd_{n3}\text{-}St_{n4}\text{-}R$, where AA represents methacrylic acid monomer unit or acrylic acid monomer unit, St represents styrene monomer unit, Bd represents butadiene monomer unit, R represents an alkyldithio ester group or an alkyltrithio ester group, average degree of polymerization of each block is $n_1=20\text{-}60$, $n_2=100\text{-}500$, $n_3=200\text{-}3000$, $n_4=100\text{-}500$; if $n_3>1500$, a portion of polybutadiene segments forms a crosslinked structure, resulting in a gel, content of which increases with the increase of $n_3$;
   (2) the block copolymer is stably dispersed in water in the form of particles, to be called as a latex, having an volume average particle diameter of 60-200 nm and a core-shell structure.

2. A method for preparing the block copolymer according to claim 1, wherein the method is a reversible addition fragmentation chain transfer emulsion polymerization, comprising the following steps:
   adding 0.2 to 2 parts by weight of an amphiphilic macromolecule reversible addition fragmentation chain transfer agent to 20 to 100 parts by weight of water to form an aqueous phase; mixing the aqueous phase and 2 to 10 parts by weight of styrene, and transferring the resulting mixture into a reactor; purging with nitrogen gas under stirring to remove oxygen from the reactor for 30 to 60 minutes; after heating up to 60° C. to 80° C., adding 0.005 to 0.04 parts by weight of a water-soluble initiator, to initiate the polymerization for 20 to 110 minutes; adding 0.02 to 1 part by weight of an alkali and 0.1 to 0.5 parts by weight of sodium dodecyl sulfate (SDS), after completely mixing, adding 2 to 100 parts by weight of butadiene and additional 0 to 0.1 parts by weight of the water-soluble initiator, to react for 0.5 to 10 hours; slowly releasing the pressure and discharging the unreacted butadiene from the reactor;
   adding 2 to 10 parts by weight of styrene to the reactor, to continuously react for 20 to 110 minutes; and cooling the discharge and adding a terminating agent thereto.

3. The method according to claim 2, wherein the amphiphilic macromolecule reversible addition fragmentation chain transfer agent has a chemical structure represented by the following formula:

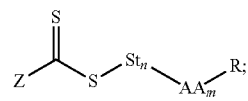

where, AA represents methacrylic acid monomer unit or acrylic acid monomer unit; St represents styrene monomer unit; Z represents alkylthio having 4 to 12 carbon atoms, alkyl having 4 to 12 carbon atoms, phenyl or benzyl; R represents iso-propionyloxy, acetoxy, 2-cyanoacetoxy or 2-amidoacetoxy; m represents an average degree of polymerization of the methacrylic acid monomer unit or the acrylic acid monomer unit and m=10-60; n represents an average degree of polymerization of the styrene monomer unit and n=3-10.

4. The method according to claim 3, wherein the amphiphilic macromolecule reversible addition fragmentation chain transfer agent is an amphiphilic oligomer with a molecular weight of 1000-6000.

5. The method according to claim 2, wherein the water-soluble initiator is potassium persulfate, ammonium persulfate, hydrogen peroxide, and derivatives thereof, and VA-061, VA-044, V501 or V50.

6. The method according to claim 2, wherein the alkali is sodium hydroxide, potassium hydroxide, ammonia, sodium carbonate, potassium carbonate, sodium bicarbonate or potassium bicarbonate.

* * * * *